(12) United States Patent
Uchida

(10) Patent No.: US 11,492,042 B2
(45) Date of Patent: Nov. 8, 2022

(54) DISPLAY CONTROL APPARATUS

(71) Applicant: Suzuki Motor Corporation, Hamamatsu (JP)

(72) Inventor: Hitoshi Uchida, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 328 days.

(21) Appl. No.: 16/539,448

(22) Filed: Aug. 13, 2019

(65) Prior Publication Data

US 2020/0070876 A1    Mar. 5, 2020

(30) Foreign Application Priority Data

Aug. 31, 2018 (JP) .............................. JP2018-163474

(51) Int. Cl.
| | |
|---|---|
| *B62D 6/00* | (2006.01) |
| *G01L 5/22* | (2006.01) |
| *B62D 5/04* | (2006.01) |
| *B60K 37/02* | (2006.01) |

(52) U.S. Cl.
CPC .............. *B62D 6/005* (2013.01); *B60K 37/02* (2013.01); *B62D 5/0463* (2013.01); *G01L 5/221* (2013.01)

(58) Field of Classification Search
CPC ...... B62D 6/005; B62D 5/0463; B60K 37/02; G01L 5/221
See application file for complete search history.

(56) References Cited

U.S. PATENT DOCUMENTS

| | | | |
|---|---|---|---|
| 8,633,811 B2* | 1/2014 | Ikeda ................. | B62D 15/0275 340/441 |
| 9,827,907 B2* | 11/2017 | Sugita ................. | B62D 15/021 |
| 2016/0207537 A1* | 7/2016 | Urano ................. | B62D 1/286 |
| 2017/0313304 A1 | 11/2017 | Shiraishi et al. | |
| 2018/0304883 A1 | 10/2018 | Mueller | |

FOREIGN PATENT DOCUMENTS

| | | |
|---|---|---|
| DE | 102015005975 A1 | 11/2016 |
| DE | 102017108782 A1 | 11/2017 |
| JP | 2005212501 A | 8/2005 |
| JP | 201678738 A | 5/2016 |

OTHER PUBLICATIONS

List of Documents Cited from first Indian Examination Report for Application No. 201914027032 dated Jul. 31, 2020; 1 page.
French Search Report for Application No. FR1909519, dated Jun. 25, 2021, 9 pages.
German Office Action For Application No. 102019122380.6 dated Oct. 5, 2021, pp. 1-6.

* cited by examiner

*Primary Examiner* — Truc M Do
(74) *Attorney, Agent, or Firm* — Lerner, David, Littenberg, Krumholz & Mentlik, LLP

(57) ABSTRACT

A display control apparatus comprises a receiving unit that receives a steering assist amount in an electric power steering system of a vehicle and a measured value of a yaw rate sensor provided in the vehicle; a sign determination unit that determines a sign of the steering assist amount or a sign of the measured value of the yaw rate sensor received by the receiving unit; and a calculation unit that calculates a display steering assist index value to be displayed on a display device in the vehicle based on the sign determined by the sign determination unit, and the steering assist amount and the measured value of the yaw rate sensor received by the receiving unit.

1 Claim, 5 Drawing Sheets

DISPLAY CONTROL APPARATUS

CROSS-REFERENCE TO RELATED APPLICATIONS

This application claims the benefit of the filing date of Japanese Patent Application No. 2018-163474, filed Aug. 31, 2018, the disclosure of which is hereby incorporated herein by reference.

BACKGROUND OF THE INVENTION

Technical Field

The present invention relates to display control apparatuses for electric power steering systems of vehicles.

Background Art

Japanese Patent Publication JP 2005-212501A discloses an electric power steering assist amount display method for assisting steering by a motor. This method is purported to include calculating a motor command current value according to a torque generated by a steering operation by a driver; and displaying the calculated motor command current value on a display device as an assist amount.

BRIEF SUMMARY OF THE INVENTION

Problems to be Solved by the Invention

It is considered that the method of displaying the electric power steering assist amount on the display device gives the vehicle occupant a greater sense of security than a method of not displaying the electric power steering assist amount on the display device. However, depending on the running state of the vehicle, a sense of incongruity may occur between the impression the occupant receives from the display of the electric power steering assist amount and the perception of the occupant regarding the vehicle behavior while running.

An object of the present invention is to reduce the probability of occurrence of a sense of incongruity between the impression an occupant receives from the display of the electric power steering assist amount and the perception of the occupant regarding the vehicle behavior while running.

Means for Solving the Problems

In order to achieve the above object, a display control apparatus according to the present invention comprises: a receiving unit configured to receive a steering assist amount in an electric power steering system of a vehicle and a measured value of a yaw rate sensor provided in the vehicle; a sign determination unit configured to determine a sign of the steering assist amount or a sign of the measured value of the yaw rate sensor received by the receiving unit; and a calculation unit configured to calculate a display steering assist index value to be displayed on a display device in the vehicle based on the sign determined by the sign determination unit, and the steering assist amount and the measured value of the yaw rate sensor received by the receiving unit.

Advantageous Effects of the Invention

The present invention can reduce the probability of occurrence of a sense of incongruity between the impression an occupant receives from the display of the electric power steering assist amount and the perception of the occupant regarding the vehicle behavior while running.

DETAILED DESCRIPTION

Mode for Carrying Out the Invention

Hereinafter, the present invention will be described based on illustrated embodiments. It should be noted that the present invention is not limited to the embodiments described below.

Figure 1:
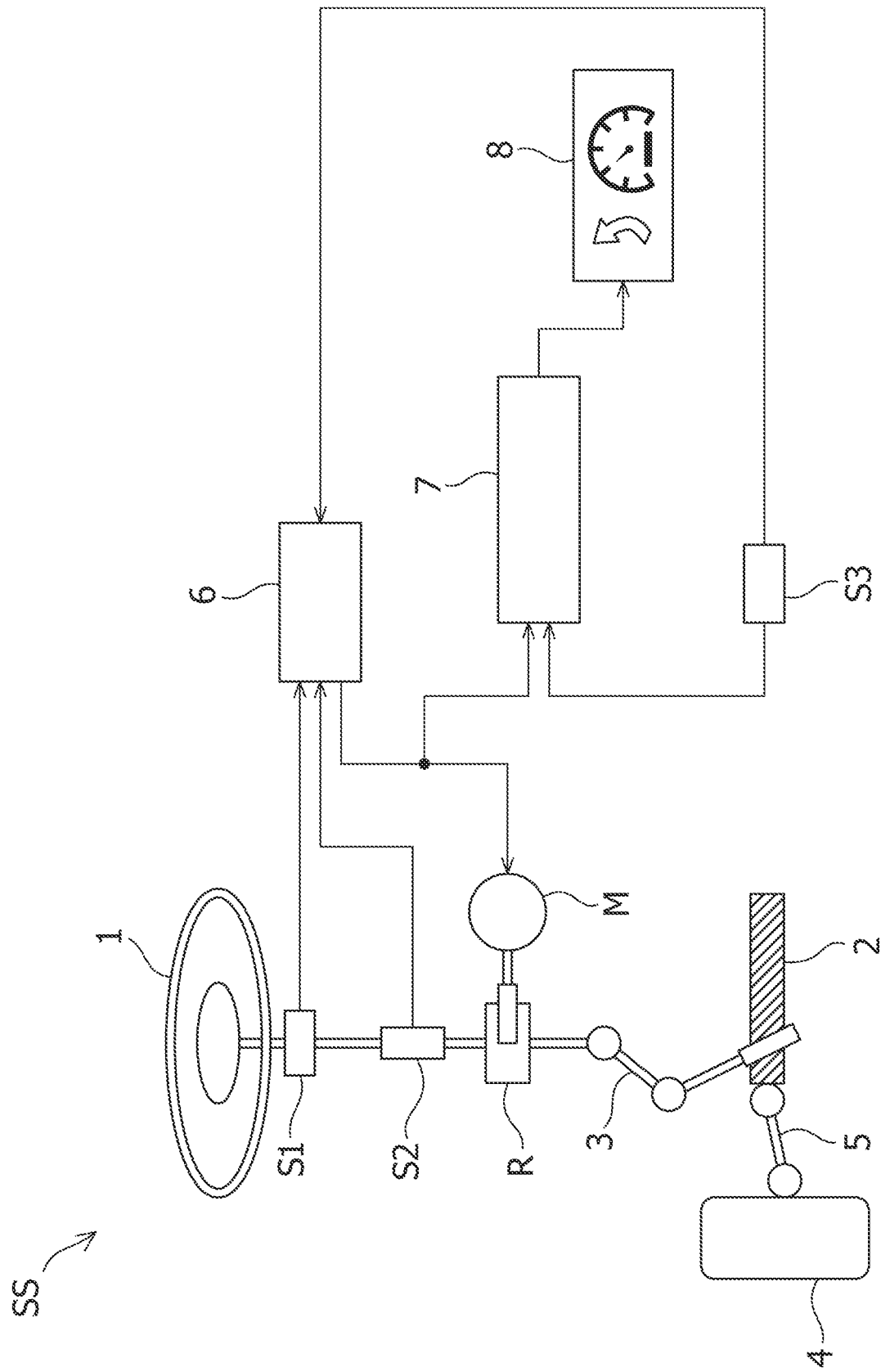
FIG. 1 is an explanatory drawing of an electric power steering system.

FIG. 1 illustrates an electric power steering system SS (hereinafter referred to simply as "system") of a vehicle. In the system SS, a steering wheel 1 is connected to a steering gear box 2 by a steering shaft 3. Further, the steering gear box 2 is connected to a wheel 4 by a tie rod 5.

A steering angle sensor S1, a torque sensor S2, and a speed reducer R having a motor M assembled thereto, are mounted to the steering shaft 3. The steering angle sensor S1 measures a steering angle of the steering wheel 1 operated by a vehicle occupant, and sends the measured steering angle to a steering assist control device 6. The torque sensor S2 measures a torque (steering torque) generated by the steering wheel 1 operated by the occupant, and sends the measured torque to the steering assist control device 6. The steering assist control device 6 further receives a yaw rate of the vehicle (rotational angular velocity about a vertical axis passing through the center of gravity of the vehicle) measured by a yaw rate sensor S3 provided in the vehicle.

The measurement value of the yaw rate is a signed value. As an example, when the vehicle is rotating counterclockwise about the vertical axis in plan view of the vehicle, the measured value of the yaw rate is a positive value, and when the vehicle is rotating clockwise about the vertical axis in plan view of the vehicle, the measured value of the yaw rate is a negative value.

Based on the steering angle measured by the steering angle sensor S1, the torque measured by the torque sensor S2, and the yaw rate measured by the yaw rate sensor S3, the steering assist control device 6 calculates the steering assist amount for steering assist and sends the steering assist amount to the motor M. As an example, in the case of left steering, the steering assist amount is a positive value, and in the case of right steering, the steering assist amount is a negative value. The motor M rotates based on the steering assist amount, and the rotation is transmitted to the steering shaft 3 through the speed reducer R thereby to perform steering assist to the steering wheel 1 operated by the occupant.

The steering assist amount by the steering assist control device 6 and the measured value of the yaw rate by the yaw rate sensor S3 are also sent to the display control apparatus 7. Based on the steering assist amount and the measured value of the yaw rate received, the display control apparatus 7 calculates a display steering assist index value. The flow of calculating the display steering assist index value will be described later. The display steering assist index value is sent from the display control apparatus 7 to the display device 8 that is a kind of human-machine interface (HMI). This display steering assist index value is to be displayed on the display device 8 visually recognized by the occupant of the vehicle and does not necessarily coincide with the steering assist amount by the steering assist control device 6.

Figure 2:
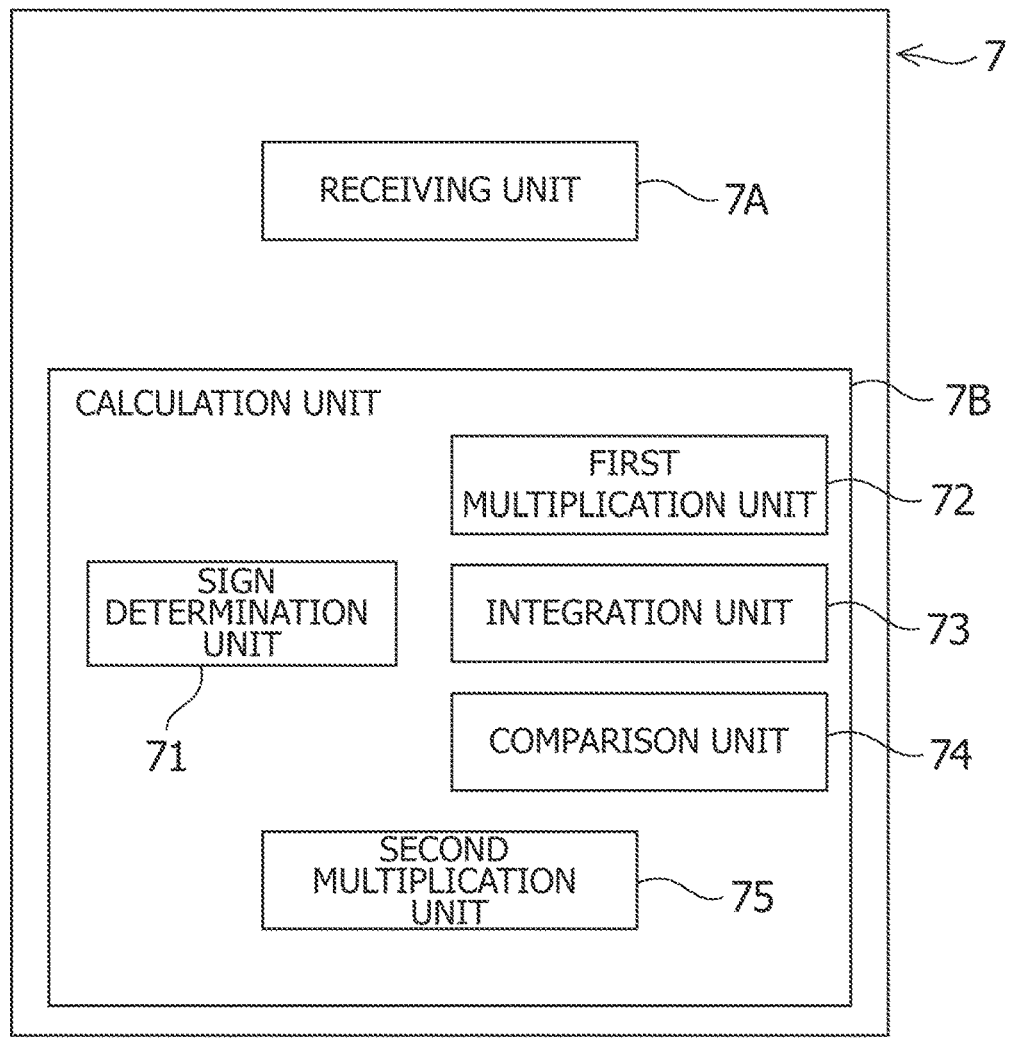
FIG. 2 is an explanatory drawing of a display control apparatus.

As illustrated in FIG. 2, the display control apparatus 7 comprises a receiving unit 7A and a calculation unit 7B. The calculation unit 7B comprises a sign determination unit 71, a first multiplication unit 72, an integration unit 73, a comparison unit 74, and a second multiplication unit 75.

The processing content of each unit of the display control apparatus 7 will be described in detail later. Note that as the hardware configuration, the display control apparatus 7 comprises a memory that stores programs and data operable to execute the function of each unit; a processor that performs arithmetic processing; and an interface to and from other devices in the system SS.

The receiving unit 7A receives the steering assist amount from the steering assist control device 6 and the measured value of the yaw rate from the yaw rate sensor S3. The steering assist amount received by the receiving unit 7A is input to the sign determination unit 71 and the first multiplication unit 72. The measured value of the yaw rate received by the receiving unit 7A is input to the first multiplication unit 72.

The sign determination unit 71 determines the sign of the steering assist amount received from the receiving unit 7A. Specifically, the sign determination unit 71 compares the received steering assist amount with an input value in a steering neutral state, and obtains the sign according to the comparison result. As an example, when the input value indicates a steering assist to the left, the sign of "+1" is obtained, when the input value is the same as the input value in the neutral state, the sign of "0" is obtained, and when the input value indicates a steering assist to the right, the sign of "4" is obtained. The sign obtained in this manner is sent to the second multiplication unit 75.

Since the sensor input in the neutral state has an electrical and mechanical zero point error, the input value in the mechanical neutral state can be learned in advance.

The first multiplication unit 72 multiplies the steering assist amount received from the receiving unit 7A by the measured value of the yaw rate received from the receiving unit 7A. This multiplication corresponds to the combination of the steering assist amount and the measured value of the yaw rate sensor. The product by this multiplication is a kind of work rate. When the steering assist amount and the yaw rate measurement value have the same sign, the product is a positive value, and when the steering assist amount and the yaw rate measurement value have different signs, the product is a negative value. This product is sent to the integration unit 73.

The integration unit 73 performs an integration process for a certain period of time on the product received from the first multiplication unit 72. The integration unit 73 sends the result of the integration process to the comparison unit 74. The result of the integration process can be called a workload.

Only when the steering assist amount and the yaw rate measurement value have the same sign, the workload that is the integral value also increases. When the steering assist amount and the yaw rate measurement value have different signs (when the vehicle is not moving in the steering assist direction, that is, when the causal relationship is not established), the integrated workload decreases.

Since the steering assist amount is an input to the vehicle for controlling the vehicle, the steering assist amount can be considered as a cause in the causal relationship. Further, since the yaw rate measurement value is an output of the vehicle, which represents an actual behavior of the vehicle, the yaw rate measurement value can be considered as the result from the causal relationship.

The comparison unit 74 compares the result of the integration process obtained by the integration unit 73 with a predetermined first threshold (positive value) and obtains an output value according to the comparison result. Specifically, if the result of the integration process exceeds the first threshold, the comparison unit 74 outputs the result of the integration process to the second multiplication unit 75. On the other hand, if the result of the integration process is equal to or less than the first threshold, the comparison unit 74 outputs a value of "0" to the second multiplication unit 75.

The first threshold can be set in advance and stored in the comparison unit 74. The first threshold can be set to a relatively small value to display a fine control state on the display device 8; and the first threshold can be set to a relatively large value not to display the fine control state on the display device 8.

As described above, the output value of the comparison unit 74 is a positive value or a value of zero. If the yaw rate measurement value (result) according to the steering assist amount (cause) is obtained, that is, the causal relationship is established, the comparison unit 74 outputs a positive value. On the other hand, if the yaw rate measurement value (result) is not linked with the steering assist amount (cause), that is, the causal relationship is not established, the comparison unit 74 outputs a value of zero.

The second multiplication unit 75 multiplies the sign ("+1", "0", or "−1") received from the sign determination unit 71 by the value received from the comparison unit 74. In other words, this multiplication causes the sign determined by the sign determination unit 71 to be combined with the value received from the comparison unit. The product obtained by the multiplication is sent to the display device 8 as the display steering assist index value. The display device 8 displays the steering assist amount based on the display steering assist index value received from the second multiplication unit 75.

Figure 3:
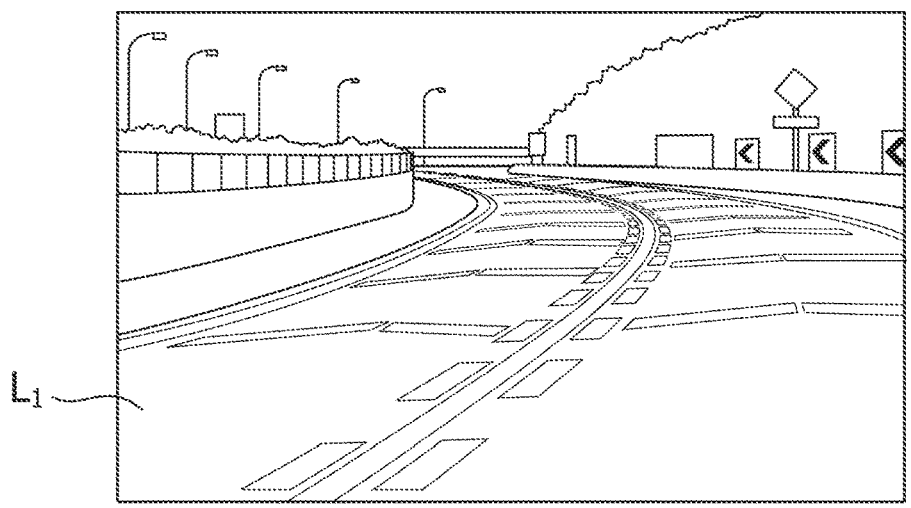
FIG. 3 is an explanatory drawing illustrating a curve in a road.

FIG. 3 illustrates a road surface $L_1$ of a road curved to the left. The description is given to a case in which a vehicle having the system SS mounted thereon runs along the road surface $L_1$ while turning to the left. Here, in order to distinguish between the left and the right, as described above, it is assumed that the left is represented by a positive value and the right is represented by a negative value. In this case, the steering assist amount by the steering assist control device 6 is a positive value. The measured value of the yaw rate by the yaw rate sensor S3 is also a positive value. The display steering assist index value by the calculation unit 7B is also a positive value.

Figure 4:
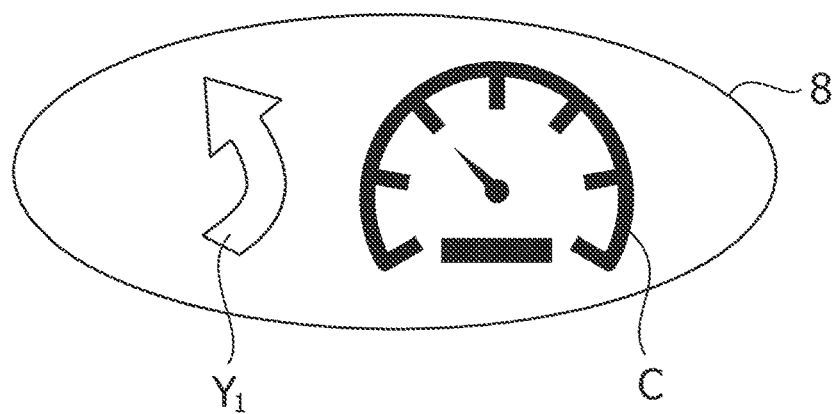
FIG. 4 is an explanatory drawing illustrating an example of a display in a display device.

As a result, as illustrated in FIG. 4, the display device 8 displays an arrow $Y_1$ having a size according to the display steering assist index value and having a shape bent to the left according to the sign of this index value. The arrow $Y_1$ is for informing the occupant of the display steering assist index value. The greater the display steering assist index value, the larger the size of the displayed arrow $Y_1$. Note that a display C indicating a speedometer is also displayed to be adjacent to the arrow $Y_1$.

As described above, when the vehicle is running on the road surface $L_1$ in FIG. 3, a left steering control is performed and the vehicle actually turns to the left. Thus, the causal relationship is established, and the arrow $Y_1$ is displayed.

Figure 5:
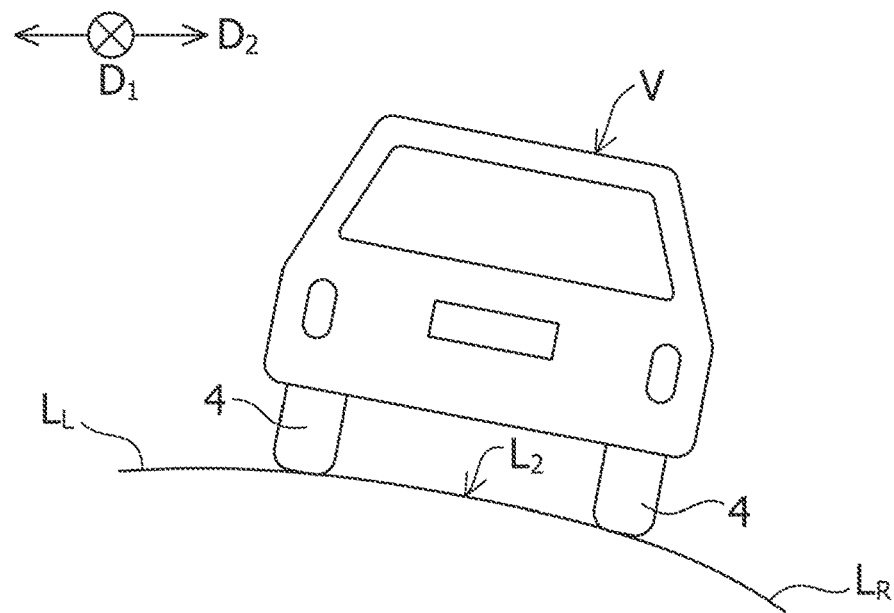
FIG. 5 is an explanatory drawing illustrating a cant provided on a road surface.

Then, the description will focus on a case in which, as illustrated in FIG. 5, a vehicle V runs straight on a road surface $L_2$ of a straight road having a cant along a direction $D_1$ directing from the front to the rear of the drawing. The cant refers to a slope inclined in a width direction $D_2$ of the road surface provided for drainage of rainwater and the like. As illustrated in the drawing, the cant is provided such that a right side shoulder $L_R$ is lower than a left side shoulder $L_L$ relative to the direction $D_1$. The angle of the cant is often too small for the occupant of the vehicle V to perceive.

Figure 6:
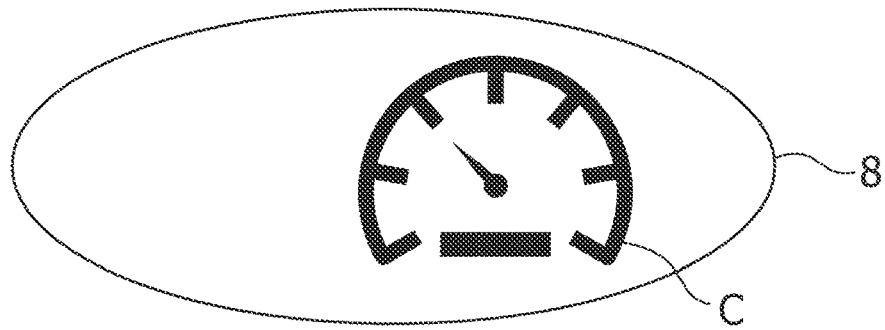
FIG. 6 is an explanatory drawing illustrating an example of the display device in the display device.

The cant causes the occupant to operate the steering wheel 1 or causes a lane keeping assist (LKA) system (not shown) mounted on the vehicle V to keep running straight, and thus, the steering assist amount by the steering assist control device 6 becomes a positive value. The measured value of the yaw rate by the yaw rate sensor S3 becomes a zero or negative value by the influence of the cant. Since the output of the comparison unit 74 becomes a value of zero, the display steering assist index value by the calculation unit 7B also becomes a value of zero. As a result, as illustrated in FIG. 6, an arrow like the arrow $Y_1$ is not displayed on the display device 8.

In contrast, unlike the above embodiment, another embodiment may be considered as a method of displaying, on the display device 8, an arrow having a size according to the steering assist amount by the steering assist control device 6 instead of the display steering assist index value. In this embodiment, the arrow $Y_1$ as illustrated in FIG. 4 is displayed on the display device 8 regardless of whether the vehicle runs on the road surface $L_1$ of the curved road or the vehicle runs straight on the road surface $L_2$ of the road having a cant.

When the arrow $Y_1$ is displayed on the display device 8 while the vehicle is running straight on the road surface $L_2$ having a cant, the occupant has an impression from the display that the vehicle is running while turning to the left. In other words, a sense of incongruity occurs between the impression the occupant receives from the display of the assist amount (such an impression as if the vehicle is running while turning to the left) and the perception of the occupant that the vehicle is running straight.

In contrast, according to the present embodiment, even in a state in which the left steering assist amount is generated in the same manner, the display on the display device 8 changes depending on whether the vehicle body is running while turning to the left or the vehicle body is running straight on the road surface having a cant. Thus, the present embodiment can reduce a sense of incongruity (discomfort of the occupant) between the impression the occupant receives from the display on the display device and the perception of the occupant regarding the vehicle behavior while running. In addition, the present embodiment can improve a sense of confidence and security for the occupant for the driving support function of the vehicle.

Figure 7:
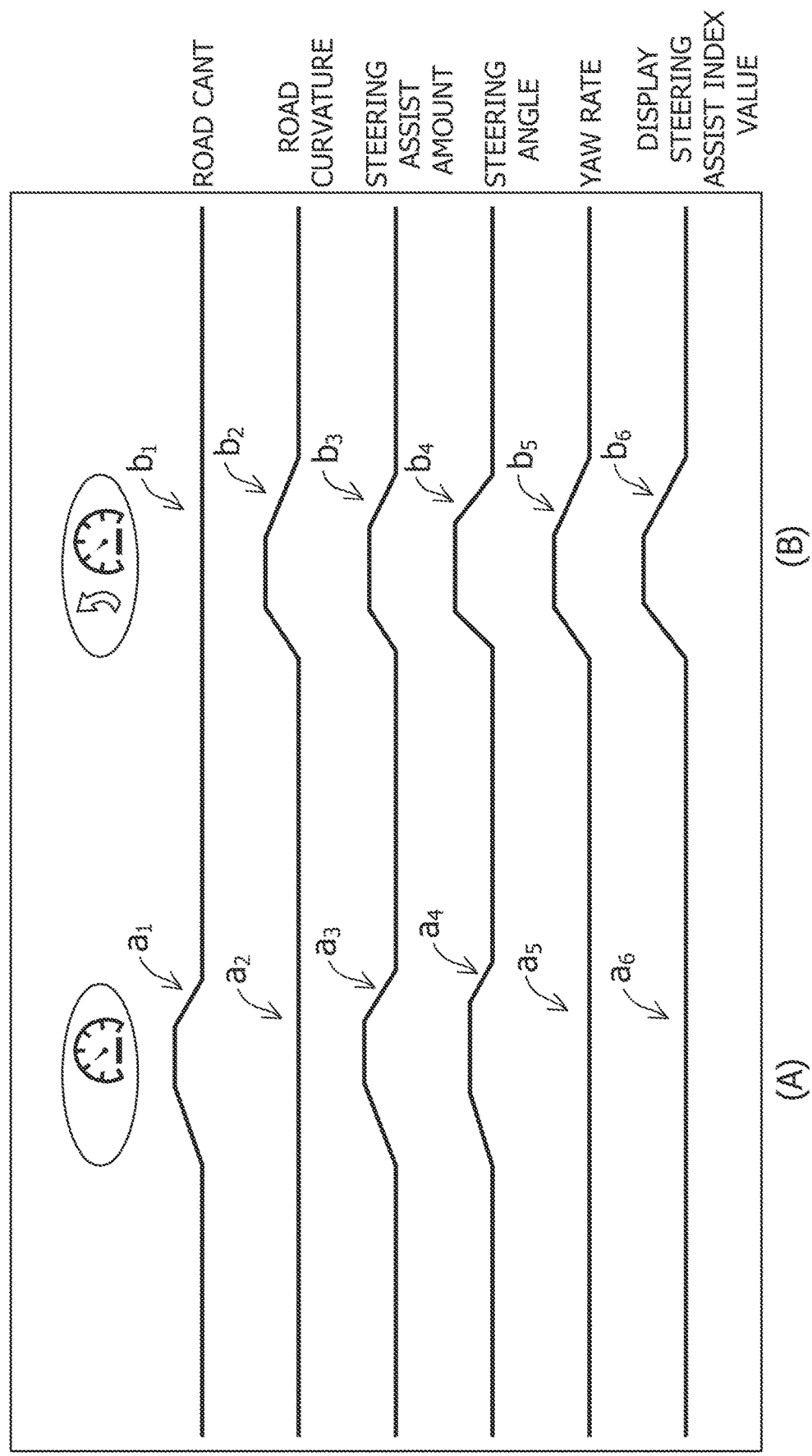
FIG. 7 is an explanatory drawing illustrating the comparison results between a case of running straight on a road surface having a cant provided thereon and a case of running on a road surface of a curved road.

As an example, FIG. 7 schematically illustrates a cant, a road curvature, a steering assist amount, a steering angle, a measured value of the yaw rate, and a display steering assist index value. FIG. 7(A) illustrates a case of running straight on the cant road surface illustrated in FIG. 5. FIG. 7(B) illustrates a case of running along the curved road surface without a cant, illustrated in FIG. 3.

The numerical value representing the cant of the road is such that in the case of running on the cant road surface, the value is a positive value as illustrated in the reference numeral $a_1$, and in the case of running along the curve, the value is a value of zero as illustrated in the reference numeral $b_1$. Note that in the case of a cant in which the right side shoulder is higher than the left side shoulder, the numerical value representing the cant is a negative value.

In the case of running on the cant road surface, the road curvature is a value of zero as illustrated in the reference numeral $a_2$, and in the case of running along the curve, the road curvature is a positive value as illustrated in the reference numeral $b_2$.

In the case of running on the cant road surface, the steering assist amount is a positive value as illustrated in the reference numeral $a_3$, and in the case of running along the curve, the steering assist amount is also a positive value as illustrated in the reference numeral $b_3$.

In the case of running on the cant road surface, the steering angle is a positive value as illustrated in the reference numeral $a_4$, and in the case of running along the curve, the steering angle is also a positive value as illustrated in the reference numeral $b_4$.

In the case of running on the cant road surface, the measured value of the yaw rate is a value of zero as illustrated in the reference numeral $a_5$, and in the case of running along the curve, the measured value of the yaw rate is a positive value as illustrated in the reference numeral $b_5$.

In the case of running on the cant road surface, the display steering assist index value is a value of zero as illustrated in the reference numeral $a_6$, and in the case of running along the curve, the display steering assist index value is a positive value as illustrated in the reference numeral $b_6$.

As described above, if the sign of the steering assist amount and the sign of the measured value of the yaw rate sensor are the same, that is, the causal relationship is established, the display steering assist index value is calculated as a non-zero value. In contrast, if the sign of the steering assist amount and the sign of the measured value of the yaw rate sensor are different, or one or both are a value of zero, that is, the causal relationship is not established, the display steering assist index value is calculated as a value of zero.

Figure 8:
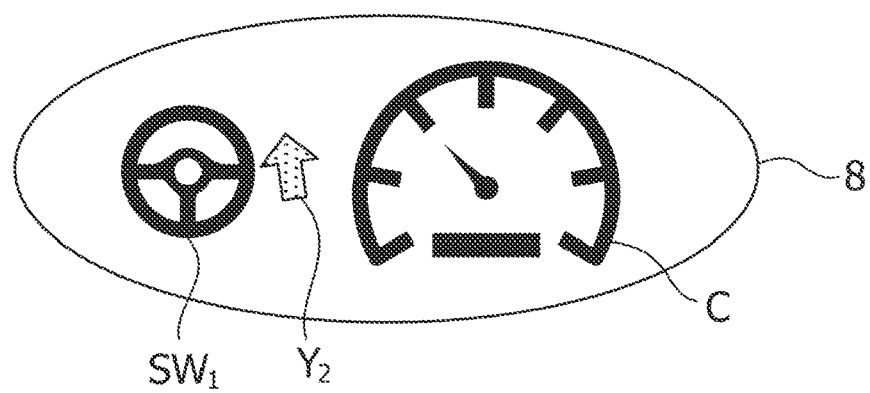
FIG. 8 is an explanatory drawing illustrating an example of a display in the display device.

Another example of the display on the display device, FIG. 8 illustrates a display example in the case of running straight on the road surface $L_2$ illustrated in FIG. 5. Adjacent to the a display C indicating a speedometer, a display $SW_1$ indicating a steering wheel in a neutral state, and an arrow $Y_2$ having a size according to the steering assist amount input to the calculation unit 7B and indicating the assist direction by a direction of rotation about display $SW_1$, are displayed.

In the above embodiment, when the vehicle runs straight on the road surface $L_2$ illustrated in FIG. 5, no arrow is displayed, as illustrated in FIG. 6. However, in the modification illustrated in FIG. 8, only if the display steering angle index value calculated by the display control apparatus 7 is a value of zero, the steering assist amount to be input to the calculation unit 7B is displayed as the arrow $Y_2$ in FIG. 8. It is possible to inform the occupant that the vehicle runs straight, but the steering assist is performed to keep running straight on the cant road surface.

Note that the display $SW_1$ indicating the steering wheel in the neutral state is based on the display steering angle index value that is calculated by the display control apparatus 7 and is displayed on the display device 8. If the sign of the steering assist amount is different from the sign of the measured value of the yaw rate sensor, that is, the causal relationship is not established, the display control apparatus 7 calculates the display steering angle index value as a value of zero.

Figure 9:
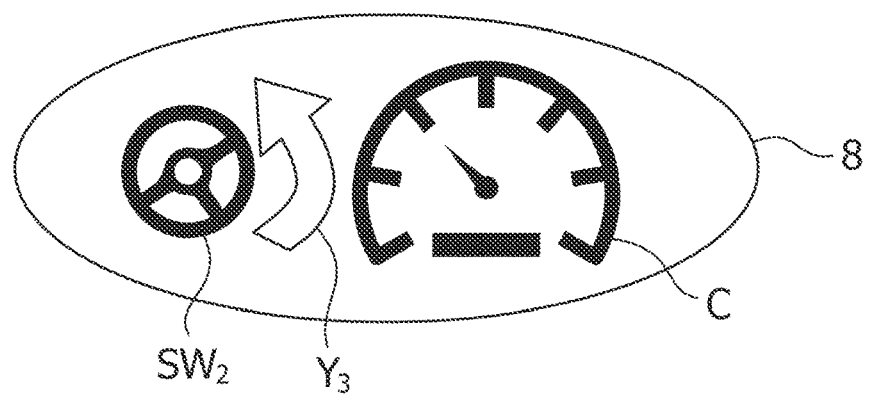
FIG. 9 is an explanatory drawing illustrating an example of another display in the display device.

As a still another example of the display on the display device, FIG. 9 illustrates a display example in the case of running on the road surface $L_1$ illustrated in FIG. 3. Adjacent to a display C indicating a speedometer, a display $SW_2$ indicating a steering wheel greatly turned to the left, and an arrow $Y_3$ having a size according to the absolute value of the display steering assist index value (positive value) and indicating a direction of counterclockwise rotation about display $SW_2$, are displayed. The arrow $Y_3$ and the arrow $Y_2$ are designed differently such that the arrow $Y_3$ is larger than the arrow $Y_2$ so that the occupant can determine the difference in meaning between the arrow $Y_3$ and the arrow $Y_2$.

The display $SW_2$ indicating the steering wheel greatly turned to the left is based on the above-described display steering angle index value. If the sign of the steering assist amount is the same as the sign of the measured value of the yaw rate sensor, that is, the causal relationship is established, the display control apparatus 7 calculates the display steering angle index value as a non-zero value according to the measured value of the steering angle sensor S1.

Note that if the display steering assist index value is a negative value, an arrow indicating a clockwise direction of rotation about the display of the steering wheel can be displayed.

As described above, if the comparison unit 74 in FIG. 2 outputs a value of zero, the display like FIG. 8 is displayed, and otherwise, the display like FIG. 9 is displayed. In other words, the display can be changed depending on whether or not the causal relationship is established. According to the difference in output of the comparison unit 74 in FIG. 2, such as the angle of the steering wheel display, the display position of the arrow, and the shape of the arrow, a display of clearly different design is used to allow the occupant to visually perceive the influence of the steering assist amount on the vehicle behavior in both qualitative and quantitative terms.

Figure 10:
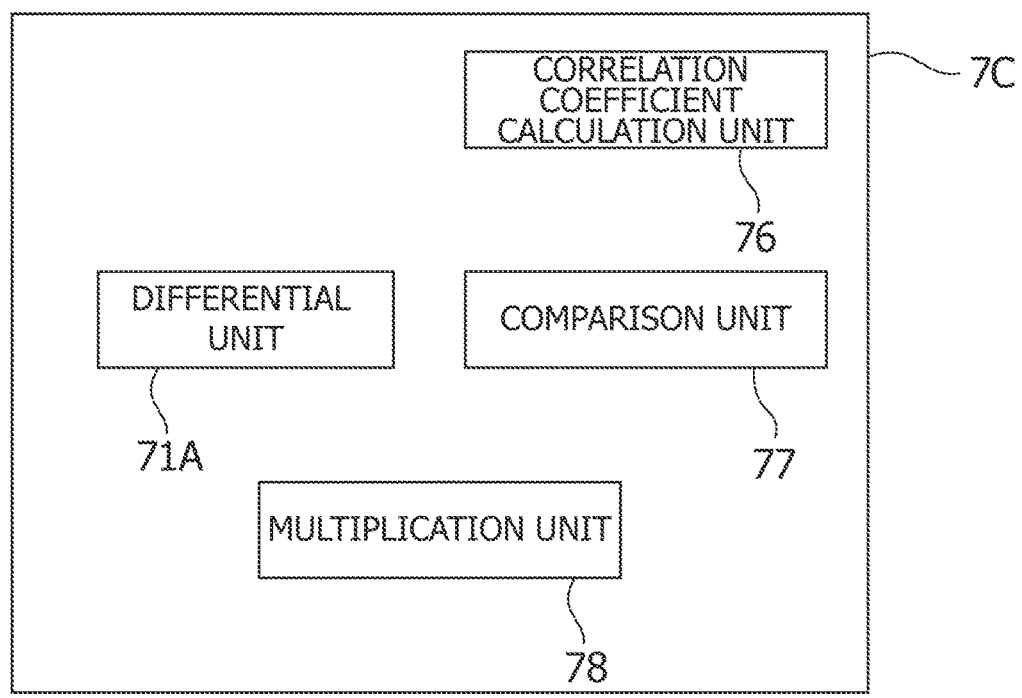
FIG. 10 is an explanatory drawing illustrating another embodiment of the display control apparatus.

The calculation unit 7B illustrated in FIG. 2 can also be replaced with a calculation unit 7C illustrated in FIG. 10. The calculation unit 7C includes not only a differential unit 71a but also a correlation coefficient calculation unit 76, a comparison unit 77, and a multiplication unit 78.

The steering assist amount received by the receiving unit 7A in FIG. 2 is input to the differential unit 71a, the correlation coefficient calculation unit 76, and the multiplication unit 78 in FIG. 10. The measured value of the yaw rate received by the receiving unit 7A is input to the correlation coefficient calculation unit 76.

The correlation coefficient calculation unit 76 calculates the correlation coefficient between the steering assist amount and the measured value of the yaw rate sensor. The correlation coefficient is a value of −1 to 1. This calculation of the correlation coefficient corresponds to combining the steering assist amount with the measured value of the yaw rate sensor. The calculated correlation coefficient is sent to the comparison unit 77.

An example of calculating a correlation coefficient r will be described. First, it is assumed that a set $(x_i, y_i)$ of the steering assist amount x, and the yaw rate sensor measurement value $y_i$ at a certain point of time is received by the receiving unit 7A. Note that index i is an integer of 1 to n, and n is an integer of 2 or more representing the number of sets $(x_i, y_i)$. Then, a set X of steering assist amounts $x_i$ and a set Y of yaw rate sensor measurement values $y_i$ are determined as follows:

$$X=(x_1, x_2, \ldots, x_n), Y=(y_1, y_2, \ldots, y_n).$$

The correlation coefficient r between the set X and the set Y is calculated as follows: Equation 1:

$$r = \frac{s_{xy}}{s_x \times s_y} = \frac{\frac{1}{n}\sum_{i=1}^{n}(x_i - \bar{x})(y_i - \bar{y})}{\sqrt{\frac{1}{n}\sum_{i=1}^{n}(x_i - \bar{x})^2} \times \sqrt{\frac{1}{n}\sum_{i=1}^{n}(y_i - \bar{y})^2}} \quad \text{Equation 1}$$

Where $s_{xy}$ is the covariance of x and y, $s_x$ is the standard deviation of x, and $s_y$ is the standard deviation of y.

$$\bar{x} \quad \text{Equation 2:}$$

is the average of x, and $$\bar{y} \quad \text{Equation 3:}$$

is the average of y.

In a scatter diagram with the steering assist amount on the horizontal axis and the yaw rate measurement value on the vertical axis, whether the linear approximation is rising to the right or falling to the right can be determined from whether the correlation coefficient is a positive value or a negative value. In addition, the strength of the causal relationship between the steering assist amount and the yaw rate measurement value can be determined from how close the correlation coefficient is to 1. The case in which the correlation coefficient is a positive value (linear approximation rising to the right) corresponds to the case in which the steering assist amount and the yaw rate measurement value have the same sign. In addition, the case in which the correlation coefficient is a negative value (linear approximation falling to the right) corresponds to the case in which the steering assist amount and the yaw rate measurement value have different signs.

The comparison unit 77 compares the correlation coefficient obtained by the correlation coefficient calculation unit 76 with a predetermined second threshold (positive value) and obtains an output value according to the comparison result. Specifically, if the correlation coefficient exceeds the second threshold, the comparison unit 77 outputs the correlation coefficient as is to the multiplication unit 78. On the other hand, if the correlation coefficient is equal to or less than the second threshold, the comparison unit 77 outputs a value of "0" to the multiplication unit 78. Note that, in the same manner as the first threshold, the predetermined second threshold can be set in advance and stored in the comparison unit 77.

The differential unit 71a determines the sign ("+1" or "−1") of change in the steering assist amount $x_1, x_2, \ldots, x_n$, and outputs the determined sign to the multiplication unit 78.

The multiplication unit 78 multiplies the sign of rate of change in the steering assist amount determined by the differential unit 71a, the steering assist amount received from the receiving unit 7A, and the value obtained by the comparison unit 77, thereby calculating the display steering assist index value. When the steering assist amount increases or decreases, this processing can calculate what percentage of the change in the assist amount is observed as a change in the vehicle motion for an HMI display to the occupant.

As described above, the calculation unit 7C can also calculate the display steering assist index value.

It should be noted that the sign determination unit 71 need not be provided inside the calculation unit 7B, but need only be provided inside the display control apparatus 7. The same is applied to the differential unit 71a.

The sign determined by the sign determination unit 71 affects the result of multiplication in the second multiplication unit 75 in the case in which the output of the comparison unit 74 is a positive value. In this case, the steering assist amount and the yaw rate measurement value have the same sign. For this reason, the sign determination unit 71 may be configured to determine not the sign of the steering assist amount, but the sign of the yaw rate measurement value. The same is applied to the differential unit 71a.

The differential unit 71a may also be called a sign determination unit 71a.

The above-described functional configuration and physical configuration of the electric power steering system and the display control apparatus are not limited to the above-described embodiments, and for example, each function and physical resource may be implemented in an integrated manner, or conversely, implemented separately.

Hereinbefore, the embodiments of the present invention have been described, but the present invention is not limited to the above-described embodiments, and various modifications and changes can be made based on the technical idea of the present invention.

REFERENCE SIGNS LIST

SS steering system
1 steering wheel
2 steering gear box
3 steering shaft
4 wheel
5 tie rod
S1 steering angle sensor
S2 torque sensor
S3 yaw rate sensor
M motor
R speed reducer
6 steering assist control device
7 display control apparatus
7A receiving unit
7B calculation unit
71 sign determination unit
72 first multiplication unit
73 integration unit
74 comparison unit
75 second multiplication unit
7C calculation unit
76 correlation coefficient calculation unit
77 comparison unit
78 multiplication unit
8 display device

The invention claimed is:

1. A display control apparatus comprising:
   a receiving unit configured to receive a steering assist amount in an electric power steering system of a vehicle and a measured value of a yaw rate sensor provided in the vehicle;
   a sign determination unit configured to determine a sign of the steering assist amount or a sign of the measured value of the yaw rate sensor received by the receiving unit; and
   a calculation unit configured to calculate a display steering assist index value to be displayed on a display device in the vehicle based on the sign determined by the sign determination unit, and based on a combination of the steering assist amount and the measured value of the yaw rate sensor received by the receiving unit,
   wherein the calculation unit is configured to:
   calculate the display steering assist index value according to the steering assist amount and calculate a display steering angle index value to be displayed on the display device according to a steering angle of the vehicle if the sign of the steering assist amount and the sign of the measured value of the yaw rate sensor are the same; and
   calculate the display steering assist index value according to the steering assist amount and calculate the display steering angle index value as a value of zero if the sign of the steering assist amount and the sign of the measured value of the yaw rate sensor are different.

* * * * *